United States Patent [19]
Leonhart et al.

[11] Patent Number: 5,424,805
[45] Date of Patent: Jun. 13, 1995

[54] VACUUM BLANKET LIFTING APPARATUS

[75] Inventors: Charles J. Leonhart, Schaumburg; William R. Walters, Union, both of Ill.

[73] Assignee: nuArc Company, Inc., Niles, Ill.

[21] Appl. No.: 144,573

[22] Filed: Oct. 28, 1993

[51] Int. Cl.⁶ .............................................. G03B 27/20
[52] U.S. Cl. ........................................ 355/92; 355/94
[58] Field of Search ..................... 355/87, 91, 92, 93, 355/94

[56] References Cited
U.S. PATENT DOCUMENTS

| | | | |
|---|---|---|---|
| 4,551,016 | 11/1985 | Maher et al. | 355/91 |
| 4,935,773 | 6/1990 | Meacham | 355/92 |
| 4,967,230 | 10/1990 | Meacham | 355/91 |
| 5,072,257 | 12/1991 | Stoesser et al. | 355/93 |

*Primary Examiner*—Richard A. Wintercorn
*Attorney, Agent, or Firm*—Mason, Kolehmainen, Rathburn & Wyss

[57] ABSTRACT

Vacuum frame apparatus is provided for maintaining precise registration between and an image forming sheet to be reproduced and a light sensitive sheet adapted for controlled exposure to light. The apparatus includes a light transmitting glass panel having a planar surface for contact with the image sheet and a vacuum blanket assembly including a blanket of thin, flexible sheet material adapted to contact the light sensitive sheet and bias the sheets toward the planar surface of the glass panel while maintained in precise registration. The vacuum blanket assembly includes a peripheral edge seal around the blanket for sealing engagement with the planar face of the glass panel and means for evacuating the space inside the peripheral edge bead between the planar face of the panel and the blanket of the vacuum blanket. A novel platen system is provided for moving the vacuum blanket and sheets thereon bodily toward the glass panel in a direction perpendicular thereto to engage the peripheral edge bead in a floating manner whereby the sealing pressure is equal along the entire length thereof. Thereafter a vacuum can be rapidly drawn between the sheets, the vacuum blanket and the planar surface of the glass panel.

22 Claims, 6 Drawing Sheets

VACUUM BLANKET LIFTING APPARATUS

BACKGROUND OF THE INVENTION

1. Field of the Invention

The present invention relates to a new and improved method and apparatus for maintaining precise registration between an image sheet and a light sensitive sheet for reproduction of copies of the image sheet.

More particularly, the invention pertains to a new and unique vacuum frame apparatus including a light transmitting panel having a planar surface for contact with an image sheet and a vacuum blanket assembly for biasing the image sheet and a light sensitive sheet toward the planar surface of a glass panel. The vacuum blanket is supported on a movable platen for floating movement in a direction perpendicular to the glass panel to establish a peripheral edge seal therewith so that fluid may be rapidly evacuated from the space between the blanket and the panel.

The vacuum frame apparatus of the present invention is an improvement over those shown and described in U.S. Pat. Nos. 4,935,773 and 4,967,230, which patents are incorporated herein by reference.

2. Background of the Prior Art

U.S. Pat. Nos. 4,967,230 and 4,935,773 disclose a registration system for light exposure apparatus and a vacuum blanket, respectively, which have been successful in producing high quality images at high production rates on an economic and efficient basis.

OBJECTS OF THE INVENTION

It is an object of the present invention to provide a new and improved method for maintaining precise registration between an image sheet and a light sensitive sheet for reproducing copies.

Another object of the invention is to provide a new and improved vacuum frame apparatus for maintaining precise registration between an image sheet and a light sensitive sheet for reproducing copies in a fast and efficient manner at relatively low cost.

Still another object of the present invention is to provide a new and improved vacuum frame apparatus having a platen movable linearly and generally perpendicularly toward a planar surface of a light transmitting panel.

Still another object of the present invention is to provide a new and improved apparatus of the character described carrying a vacuum blanket with a peripheral seal bead which is rapidly moved into in contact with a planar surface of a light transmitting panel to establish an airtight seal at all points along the seal bead.

Still another object of the present invention is to provide a new and improved vacuum frame apparatus wherein graphic arts materials are not disturbed and remain virtually motionless relative to each other so that precise registration is maintained during the evacuation process.

Another object of the present invention is to provide a new and improved vacuum frame apparatus which includes a glass frame that is easily opened and closed and which does not bind or pinch a peripheral edge seal of the vacuum blanket assembly.

Yet another object of the present invention is to provide a new and improved vacuum frame assembly wherein equal pressure is provided around the entire periphery of the edge seals to establish excellent and rapid sealing characteristics with minimal stress and differential pressures on a seal forming bead.

Yet another object of the present invention is to provide a new and improved vacuum frame assembly wherein vacuum blanket is bodily moved toward a glass panel in a direction generally perpendicular thereto so that the peripheral edge seal is established with uniform seal pressures at all locations around the peripheral seal.

Another object of the invention is to provide a new and improved vacuum frame assembly wherein the time required for evacuating the space between the copy materials and a light transmitting panel is greatly reduced.

Still another object of the present invention is to provide a new and improved vacuum frame assembly which provides a floating platen that is bodily movable toward a planar surface of a glass panel so that equal pressure is provided all around a peripheral bead seal as sealing occurs, thus reducing localized seal fatigue and speeding up the seal process and evacuation of the space within the seal perimeter.

BRIEF SUMMARY OF THE PRESENT INVENTION

The foregoing and other objects of the present invention are accomplished in a new and improved vacuum frame apparatus for maintaining precise registration between an image forming sheet to be reproduced on a light sensitive sheet when subjected to controlled exposure to light passing through a glass panel. The apparatus includes a light transmitting glass panel having a planar face for contact with the image sheet and a vacuum blanket assembly including a blanket of flexible sheet material adapted to contact the light sensitive sheet for biasing the same and said image sheet while maintaining precise registration therebetween toward the planar face of the glass panel which is in a locked position parallel to the vacuum blanket. The vacuum blanket includes a peripheral edge bead of resilient material extending around the sheets for establishing airtight sealing engagement with the glass panel. Vacuum pump means for evacuating the space inside the airtight peripheral edge seal between the planar face of the glass panel and the blanket is provided to bias the sheets toward the glass panel. A new and unique platen support system is provided for moving the vacuum blanket bodily toward the glass panel so that as the peripheral edge seal is rapidly established, the sealing pressure is equalized over the entire length of the seal and the evacuation process is completed.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
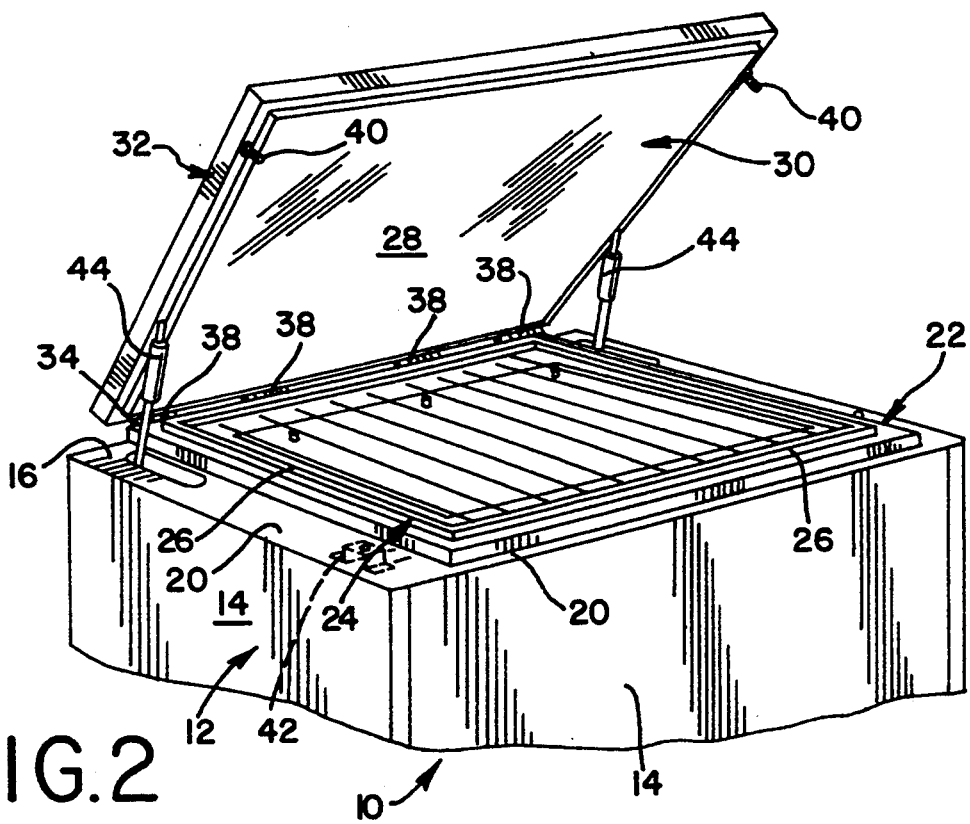
FIG. 1 is a perspective view of a new and improved vacuum frame apparatus for maintaining precise registration between an image sheet and a light sensitive sheet for reproducing copies and shown in an open position ready for loading and unloading of the sheets.

Referring now more particularly to the drawings, therein is illustrated a new and improved vacuum frame apparatus constructed in accordance with the features of the present invention and referred to generally by the reference numeral 10. The apparatus 10 includes a base cabinet 12, preferably formed of sheet metal and adapted to rest on the floor having vertically upstanding front, rear and side walls 14, integrally joined along an upper edge to a top wall 16. The top wall 16 forms an operating base positioned at a convenient working level above the floor and is formed with a large recessed central portion 18 of rectangular shape surrounded outwardly by an outer narrow marginal edge portion 20. The recessed central portion 18 of the top wall 16 includes a narrow, vertically extending peripheral edge wall 18a (FIGS. 5 and 6) surrounding a flange portion 18b for supporting operating components of the apparatus 10 including a movable platen 22.

A vacuum blanket 24 is supported by the platen 22 mounted on a foam backing board 23 and is adapted to move up and down with the platen for establishing an airtight seal between a resilient sealing bead 26 of the vacuum blanket 24 and a planar surface 28 of a glass panel 30 mounted on a peripheral support frame 32. The glass frame 32 is of rectangular shape and formed of hollow metal tubing such as aluminum to provide a strong but lightweight structure.

Figure 2:
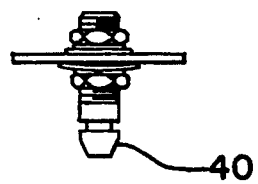
FIG. 2 is a fragmentary side elevational view of the apparatus of FIG. 1.
Figure 3:
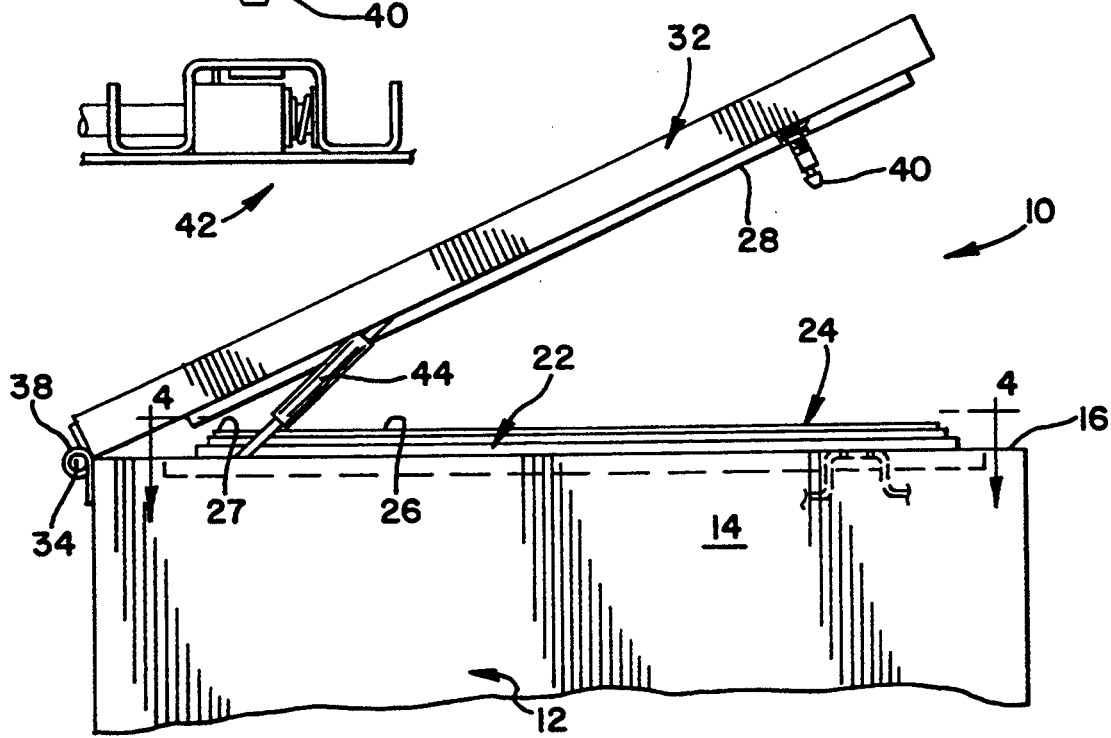
FIG. 3 is an enlarged detailed view illustrating the cooperating latching members of the apparatus of FIG. 1.
Figure 5:
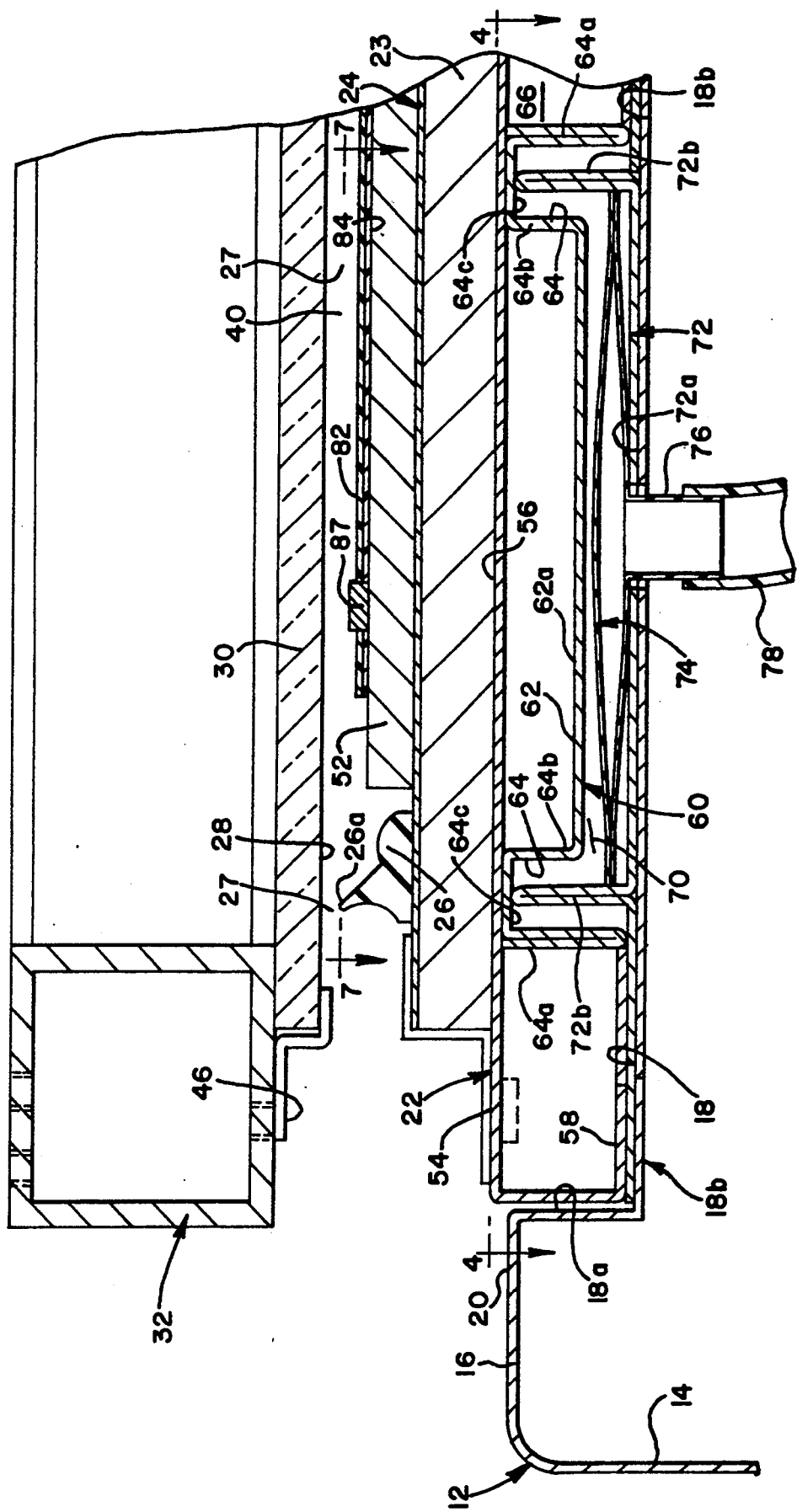
FIG. 5 is a fragmentary cross-sectional view taken substantially along lines 5—5 of FIG. 4 illustrating the apparatus with a glass panel in a closed and locked position prior to operation of the platen support system.
Figure 6:
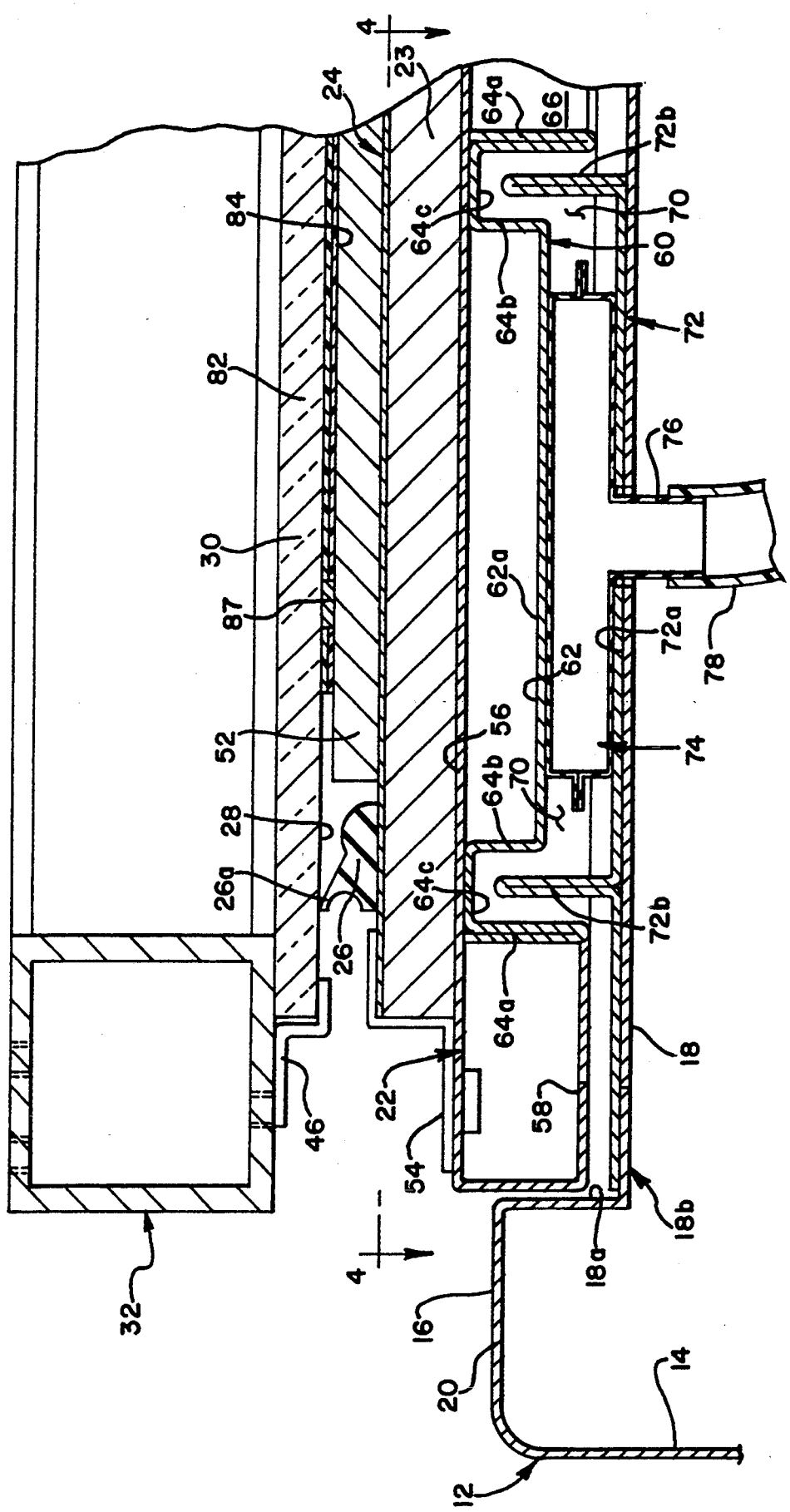
FIG. 6 is an enlarged fragmentary cross-sectional view similar to FIG. 5 but illustrating the apparatus after operation of the platen support system has been initiated for reproduction of an image on a light sensitive sheet.

As shown in FIGS. 1 and 2, the glass frame 32 is supported for pivotal movement about a horizontal pivot axis extended along a rear edge of the frame on pivot axles 34 and hinges 38 fixedly mounted on the rear wall 14 of the base cabinet 12. Along a lower, side edge of the glass frame 32 there are provided a pair of latch members 40 adapted to engage a corresponding fixed latch element 42 mounted beneath the marginal edge portion 20 of the cabinet top wall 16 inside the vertical side walls 14. The glass frame 32 is pivotal between an open position as shown in FIGS. 1 and 2 and a horizontal, closed, operating position (FIGS. 5 and 6). The latch member 40 is adapted to latchingly engage the fixed latch element 42 for securing and locking the glass frame 32 in spaced apart parallel relation above the vacuum blanket 24. The latch member 40 and cooperating latch element 42 are shown in FIG. 3. A plunger type latch and a solenoid controlled type keeper can be used for the latch member 40 and the cooperating latch element 42, as shown.

When the glass frame 32 is pivoted upwardly into an open position as shown in FIGS. 1 and 2, the frame is maintained in the open position by a pair of gas springs 44 for easy loading and unloading of sheet materials onto the vacuum blanket 24. The gas springs 44 have upper ends pivotally connected to side members of the glass frame 32 and lower ends pivotally supported from the base cabinet 12. The glass panel 30 is secured to a lower surface of the glass frame 32 by elongated frame elements 46 or clips which can be detached if it is necessary to replace the light transmitting glass panel 30 because of damage or breakage.

Figure 4:
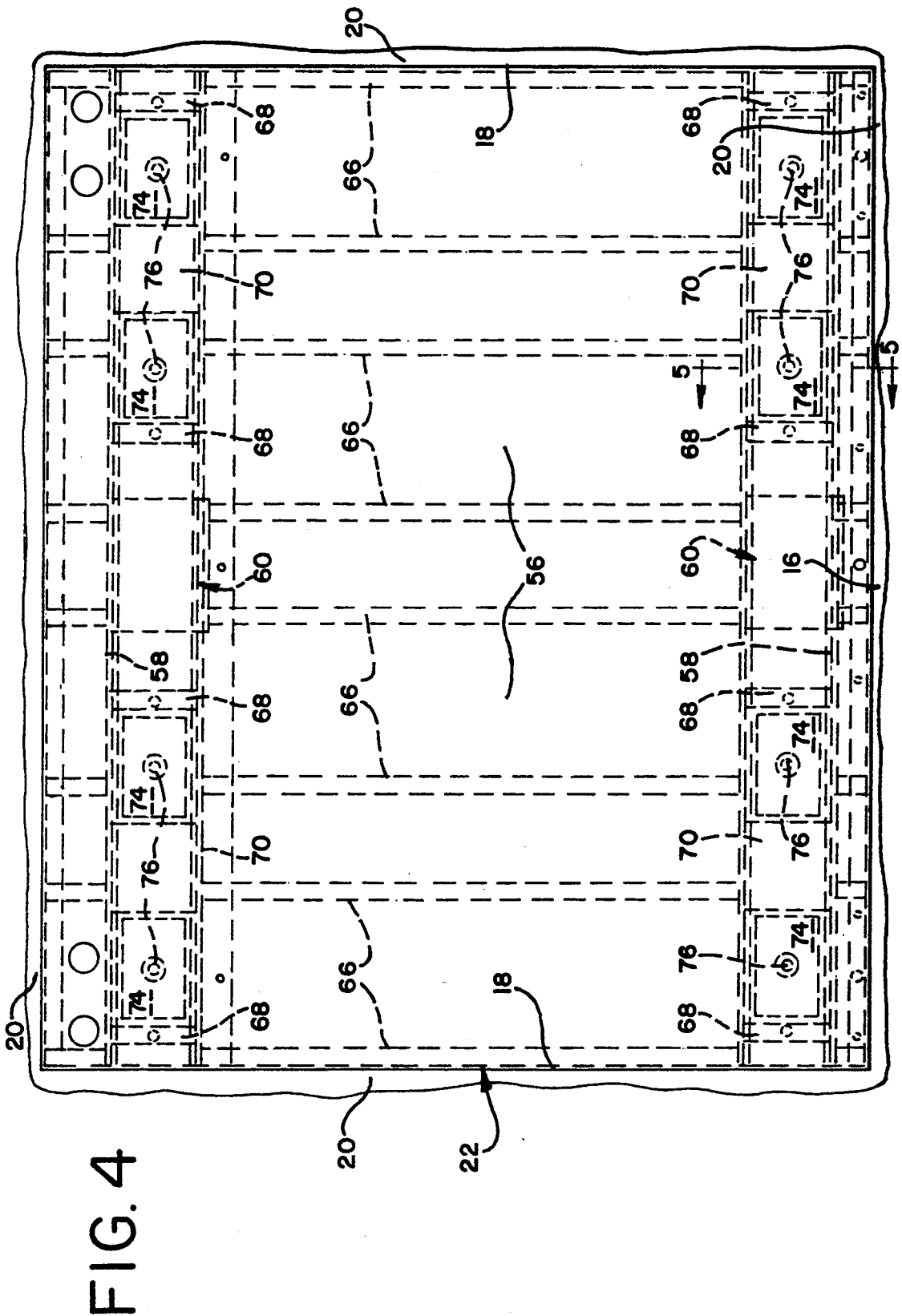
FIG. 4 is a horizontal cross-sectional view taken substantially along lines 4—4 of FIG. 5.

As shown in FIG. 2, when the glass frame 32 is in the open position, there is an open space 27 and thus no contact at all between the sealing bead 26 and the glass panel 30 even along the rearwardmost edge or run of the bead and this condition remains even as the glass frame 32 is pivoted downwardly to the closed position of FIG. 4. Accordingly, the seal bead 26 is not pinched or subjected to non-uniform sealing pressures, especially at rearward portions thereof as closure of the glass frame 32 is effected.

In accordance with the present invention, the platen 22 includes a sheet metal base 56 of substantial thickness for supporting the vacuum blanket 24, which preferably is of the type shown and described in the aforementioned U.S. Pat. Nos. 4,935,773 and 4,967,230, incorporated herein by reference. The foam board 23 below the vacuum blanket 24 is secured in place with elongated edge element 54 along the front edge only to an upper face of metal base frame 56 and is rectangular in shape.

Inwardly of the respective front and rear flanges 58, the platen base 56 is provided with a pair of sheet metal lift rails 60 of generally channel-shaped transverse cross-section having a large, centrally disposed upwardly opening and facing channel section 62 and a pair of narrow, downwardly opening and facing, integrally formed edge channels 64 along opposite edges. Outer edge flanges 64a of the narrow edge channels 64 are double thickness as shown in FIGS. 5 and 6 and are greater in height than inner edge flanges 64b which are flanges common to the larger center channel 62 and integrally joined to opposite edges of a web portion 62a thereof.

Web portions 64c of the narrow edge channels 64 are secured to the underside of the rectangular platen 56 to provide a strong, lightweight rigid sheet metal frame for carrying the vacuum blanket 24. The frame structure is further stiffened by a plurality of metal elements 66 extending transversely between the channel members 60 (FIG. 4) joined at opposite ends to the innermost flanges 64a of the front and rear narrow edge channels 64.

Below the channel members 64 and the center channel 62, the flange 18b of the recess 18 in the top wall 16 of the base cabinet carries sheet metal channels 72 having a web 72a directly below the web 62a on the platen frame 56 and a pair of vertically upstanding, double thickness, flanges 72b centrally disposed in respective narrow channels 64 between inside surfaces of the facing flanges 64a and 64b.

The channel members 72 are also stiffened internally with a plurality of short cross-members 68 (FIG. 5) extending transversely between inner surfaces of opposite flanges 72b at intervals spaced apart along the length of the channel members and dividing the interior into a plurality of lift chambers 70.

Figure 8:
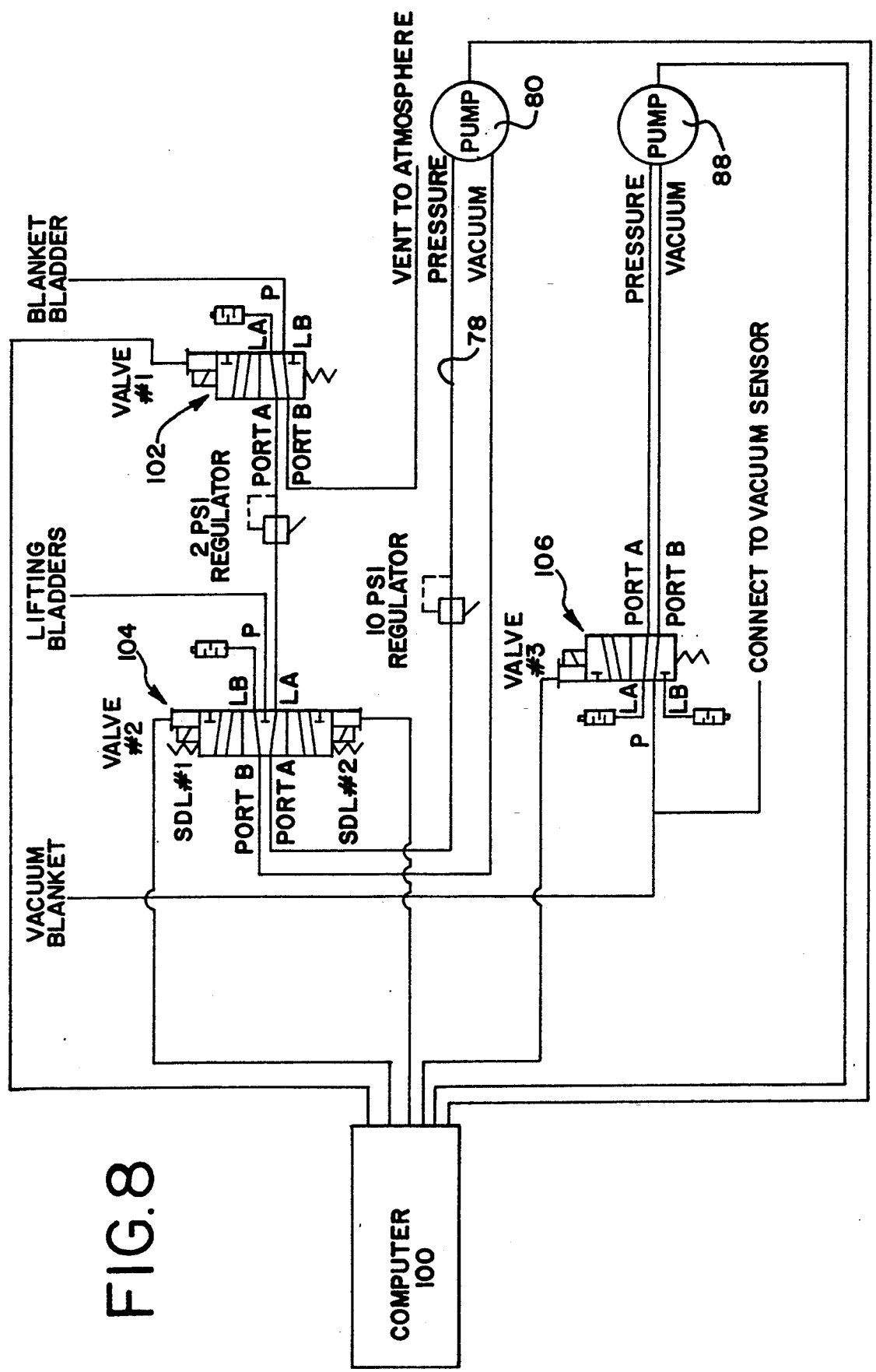
FIG. 8 is a schematic diagram of the vacuum system and controls therefor in accordance with the present invention.

In accordance with the present invention, each lift chamber 70 is provided with a pair of fluid inflatable bladders 74 (FIG. 4), formed of thin, flexible sheet material and adapted to be inflated and deflated through an integral conduit 76 joining to bottom wall of the bladder and extending downwardly through aligned openings formed in the webs 72a of the channels 72. The bladders 74 are shown having a generally rectangular shape; however, various other shapes, such as oval or round, could be used for these bladders. The conduits 76 are connected via flexible tubes 78 to a common source of pressurized fluid such as a pressure pump 80 (FIG. 8).

As best shown in FIGS. 5 and 6, when the lifting bladders 74 are deflated or at atmospheric pressure the channels 64 of the platen 22 are in a fully nested relation on the upstanding flanges 72b of the channels 72 on the recessed base flange 18b of the base cabinet 12. In this condition a clear and open space 27 is present between the lower planar surface 28 of the glass panel 30 and an upper surface of an image sheet 82. The sheet 82 is laid in precise registration over a light sensitive sheet 84 placed on a registration board 50 which in turn rests on an upper surface of a flexible blanket 86 of the vacuum blanket 24. The sheets 82 and 84 are maintained in precise registration without relative sliding movement by means of registration pins 87 extending through punched openings therein. Also, it should be noted that there is no contact between the peripheral seal bead 26 which completely surrounds the sheets 82 and 84 and the planar surface 28 on the underside of the glass panel 30, even when the glass frame 32 is moved from the open position (FIGS. 1 and 2) to the closed, horizontal operating position of FIGS. 5 and 6 wherein the glass frame is latched in parallel relationship with the platen 22 by the latch member 40 and latch element 42.

When the lift bladders 74 are simultaneously inflated by pressurized fluid from the pressure pump 80, the bladders engage the web 62a of the channels 60 of the platen 22 and bodily move the platen 22, the vacuum blanket 24 and sheets 82 and 84 upwardly toward the planar surface 28 of the locked-in-place parallel glass panel 30. The direction of movement of the platen 22 toward the glass surface 28 is perpendicular or normal thereto and continues until an upwardly sloping lip 26a of the seal bead 26 makes contact with the glass surface 28 at all points around the entire length of the seal bead to rapidly establish an airtight seal around the entire periphery of the vacuum blanket 24. Because the seal bead 26 engages the surface 28 at all points along the entire length thereof, no high stress areas or points of shear are developed in the seal bead and a long operational life is thus assured. In a prototype of the present invention, a short time interval, for example, such as, three seconds is required to establish an airtight peripheral seal of the bead 26 with the glass surface 28 when the lift bladders 74 are inflated to a pressure of 5–7 PSI. In some prior art devices wherein an airtight seal is not established at all points around the entire periphery at the same time, pinching of the seal bead often occurs as well as non-uniform sealing pressures resulting in a longer time being required to make the seal airtight and a shorter useful life for the seal bead itself.

Because the lifting action is accomplished by a plurality of fluid lift bladders 74 acting simultaneously, the platen 22 moves upwardly in a fluid, floating type, self-aligning elevation rather than with a hard or stiff mechanical action. The fluid bladders 74 equalize sealing pressure and exhibit self-aligning action. With limited movement of the platen 22 along the pitch and roll axes, the seal bead 26 contacts the glass panel surface 28.

Figure 7:
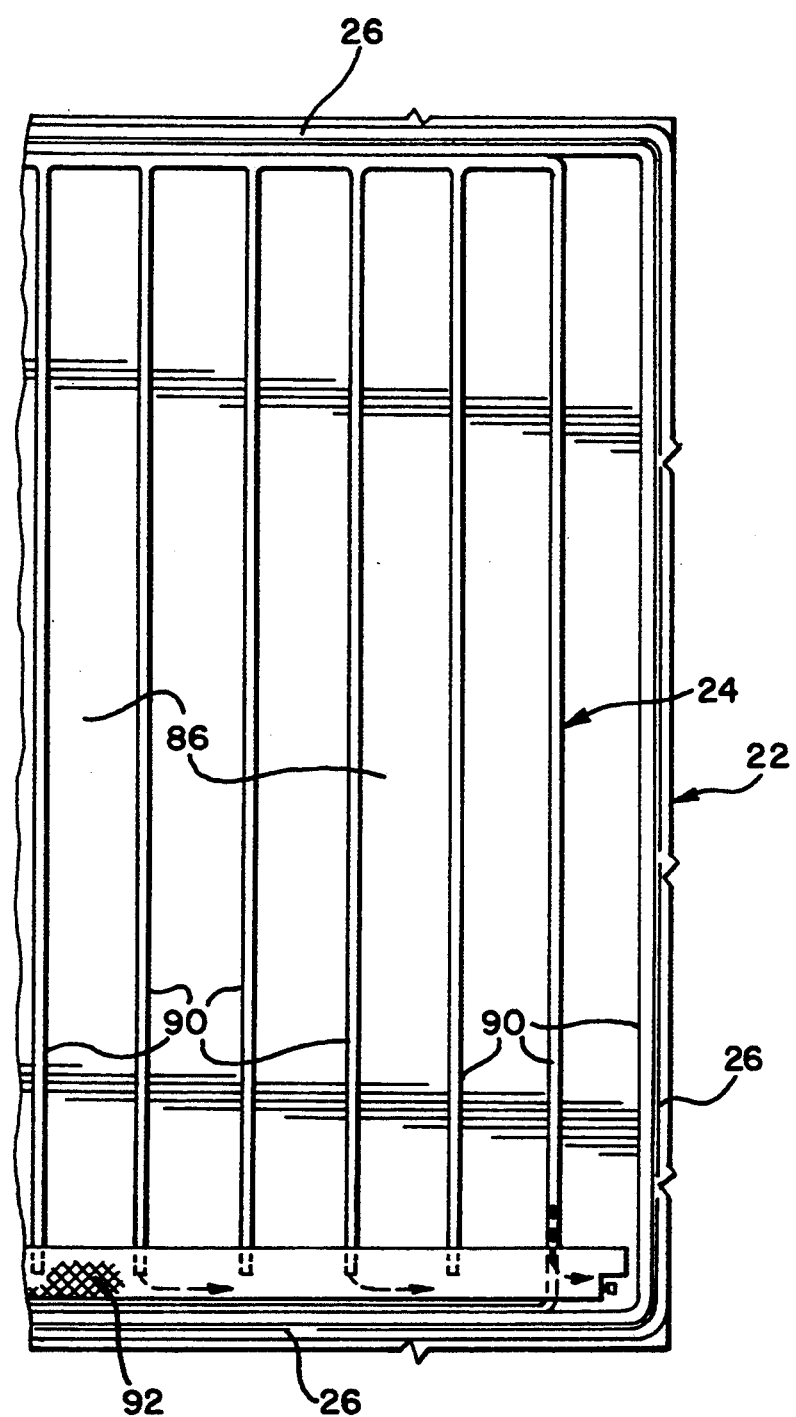
FIG. 7 is a fragmentary horizontal cross-sectional view taken substantially along lines 7—7 of FIG. 5 showing an upper face of the vacuum blanket.

After the seal bead 26 has established an airtight seal with the planar surface 28 of the glass panel 30 (FIG. 6), continued upward lift of the platen 22 moves the vacuum blanket 24 to tightly bias the sheets 82 and 84 together and also bias the upper sheet 82 directly against the glass panel surface 28. As air is evacuated from the space defined inside the peripheral seal bead 26 between the glass panel surface 28 and the vacuum blanket 24, the sheets 82 and 84 are pressed upwardly by ambient air pressure from below the blanket. The aforementioned space is evacuated by means of a vacuum pump 88 (FIG. 8) which is in operation as the peripheral seal of the bead 26 is established as more fully described in U.S. Pat. Nos. 4,935,773 and 4,967,230. Reference should be had to these patents for a more detailed description of vacuum blanket operation in which air present between the image sheet 82 and the glass surface 28 is drawn out along bleed passage areas 90 and moves toward a common rear edge portion 92 of the vacuum blanket 24 as indicated by the arrows in FIG. 7. At the same time, internal bladders in the vacuum blanket 24 positioned in the spaces between adjacent bleed passages 90 are pressurized with air from the pump 80 to aid in the process and insure that no air is entrapped between the upper image sheet 82 and glass surface 28 or between the image sheet 82 and light sensitive sheet 84.

When the desired exposure time is completed by the passage of light at controlled intensity through the closed glass panel 30 and image sheet 82 to reproduce an image on the light sensitive sheet 84, pressurized air is introduced into the space within the peripheral seal bead 26 between the glass surface 28 and the vacuum blanket 24 thus causing the airtight seal along the bead 26 to open. The lift bladders 74 are also deflated and the platen 22 moves down to the position of FIG. 5 from the position of FIG. 6. The action of breaking the airtight seal of the bead 26 and lowering of the platen 22 to a rest position (FIG. 5) takes only about three seconds also.

After the airtight seal is opened and the platen 22 is lowered to the position of FIG. 5, there remains no contact between the seal bead 26, the sheet 82 or the flexible blanket 86 of the vacuum blanket 24 with the panel surface 28, and the latch member 40 can now be easily unlatched from the fixed latch element 42 to release the glass frame 32 to automatically pivot upwardly by the force of the gas springs 44 to the open position (FIGS. 1 and 2) wherein the sheets 82 and 84 can be easily removed in readiness for the next operation.

FIG. 8 provides a schematic diagram of the vacuum system including the pumps 80 and 82 controlled by a computer 100. A pair of solenoid valves 102 and 104 operatively controlled by the computer 100 couple internal bladders in the vacuum blanket 24 and the lifting bladders 74 to pump 80. Valve 102 also controllably provides a vent to atmosphere for the blanket bladders. A third solenoid valve 102 operatively controlled by the computer 100 couples the vacuum blanket 24 to the pump 88.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Vacuum frame apparatus for maintaining precise registration between an image forming sheet to be reproduced and a light sensitive sheet adapted for controlled exposure to light, comprising:
   light transmitting panel means having a planar face for contact with said image sheet;
   a vacuum blanket assembly including a blanket of thin, flexible sheet material adapted to contact said light sensitive sheet for biasing the same and said image sheet in precise registration therewith toward said planar face of said panel;
   said vacuum blanket assembly further including a peripheral edge seal around said blanket for sealing engagement with said planar face of said panel;
   means for evacuating a space inside said peripheral edge seal between said planar face of said panel and said blanket of said vacuum blanket assembly; and
   support means including a fluid lift bladder for moving said vacuum blanket assembly toward said panel to engage said peripheral edge seal against said planar face of said panel.

2. The vacuum frame apparatus of claim 1, wherein:
   said support means includes a platen of relatively stiff construction supporting said vacuum blanket on a side of said vacuum blanket opposite said panel over at least a major portion of a surface area thereof.

3. The vacuum frame apparatus of claim 2, wherein:
   said platen is mounted for movement toward and away from said planar surface of said panel.

4. The vacuum frame apparatus of claim 3, wherein:
   said platen is bodily movable in a direction generally normal to said planar surface of said panel.

5. The vacuum frame apparatus of claim 3, wherein:
   said platen is bodily movable in a direction normal to said planar surface of said panel and is free to float along pitch and roll axes of said panel during said movement normal to said planar surface thereof.

6. Vacuum frame apparatus for maintaining precise registration between an image forming sheet to be reproduced and a light sensitive sheet adapted for controlled exposure to light, comprising:
   light transmitting panel means having a planar face for contact with said image sheet;
   a vacuum blanket assembly including a blanket of thin, flexible sheet material adapted to contact said light sensitive sheet for biasing the same and said image sheet in precise registration therewith toward said planar face of said panel;
   said vacuum blanket assembly further including a peripheral edge seal around said blanket for sealing engagement with said planar face of said panel;
   means for evacuating a space inside said peripheral edge seal between said planar face of said panel and said blanket of said vacuum blanket assembly;
   support means for moving said vacuum blanket assembly toward said panel to engage said peripheral edge seal against said planar face of said panel;
   said support means including a platen of relatively stiff construction supporting said vacuum blanket on a side of said vacuum blanket opposite said panel over at least a major portion of a surface area thereof;
   said platen being mounted for movement toward and away from said planar surface of said panel; and
   said support means further including inflatable bladder means for moving said platen toward said panel.

7. The vacuum frame apparatus of claim 6, wherein:
   said support means includes a base maintained in parallel relation to said panel for supporting said bladder means disposed between said platen and said base.

8. The vacuum frame apparatus of claim 7, wherein:
   said vacuum blanket assembly includes inflatable bladder means between said blanket and platen for biasing said blanket toward said planar surface of said panel.

9. The vacuum frame apparatus of claim 1, wherein:
   said support means a fixed base and said panel is mounted for pivotal movement relative to said fixed base between an open position extending away from an adjacent surface of said base and a closed operating position substantially parallel of said adjacent surface of said base; and wherein
   said peripheral edge seal and said blanket of said vacuum blanket assembly are spaced apart from said panel in said closed operating position until said support means moves said vacuum blanket assembly toward said panel to engage said peripheral edge seal with said planar surface thereof.

10. Vacuum frame apparatus for maintaining precise registration between an image forming sheet to be reproduced and a light sensitive sheet adapted for controlled exposure to light, comprising:
    light transmitting panel means having a planar face for contact with said image sheet;
    a vacuum blanket assembly including a blanket of thin, flexible sheet material adapted to contact said light sensitive sheet for biasing the same and said image sheet in precise registration therewith toward said planar face of said panel;
    said vacuum blanket assembly further including a peripheral edge seal around said blanket for sealing engagement with said planar face of said panel;
    means for evacuating a space inside said peripheral edge seal between said planar face of said panel and said blanket of said vacuum blanket assembly;
    support means for moving said vacuum blanket assembly toward said panel to engage said peripheral edge seal against said planar face of said panel;
    said support means including a fixed base and said panel being mounted for pivotal movement relative to said fixed base between an open position extending away from an adjacent surface of said base and a closed operating position substantially parallel of said adjacent surface of said base;
    said peripheral edge seal and said blanket of said vacuum blanket assembly being spaced apart from said panel in said closed operating position until said support means moves said vacuum blanket assembly toward said panel to engage said peripheral edge seal with said planar surface thereof; and
    latch means for securing said panel and base in spaced parallel relation when said panel is in said closed operating position.

11. A method of maintaining precise registration between an image forming sheet placed over a light sensitive sheet for reproduction of an image when exposed to light passing through a light transmitting panel having a substantially planar surface adapted for contact with said image sheet, comprising the steps of:
    forming a seal around a periphery of said sheets positioned adjacent a flexible blanket of a vacuum blanket assembly by fluid supported lifting movement of said blanket assembly toward said planar surface of said panel for engaging a peripheral edge seal of said blanket assembly against said planar surface; and removing air from a space bounded within said peripheral edge seal between said planar surface of said panel and said blanket of said blanket assembly forcing said sheet toward said planar surface of said panel.

12. The method of claim 11, wherein:
said movement of said blanket assembly is in a direction normal to said planar surface of said panel.

13. The method of claim 11, including the step of:
securing said panel in a fixed position generally parallel of and spaced away from said image sheet and said vacuum blanket assembly prior to said movement of said blanket assembly toward said panel for engaging said peripheral edge seal.

14. A method of maintaining precise registration between an image forming sheet placed over a light sensitive sheet for reproduction of an image when exposed to light passing through a light transmitting panel having a substantially planar surface adapted for contact with said image sheet, comprising the steps of:

forming a seal around a periphery of said sheets positioned adjacent a flexible blanket of a vacuum blanket assembly by movement of said blanket assembly toward said planar surface of said panel for engaging a peripheral edge seal of said blanket assembly against said planar surface;

removing air from a space bounded within said peripheral edge seal between said planar surface of said panel and said blanket of said blanket assembly forcing said sheet toward said planar surface of said panel; while said vacuum blanket assembly is supported on inflatable air bladder means for floating movement toward said planar surface of said panel.

15. The method of claim 13, including the step of:
pivoting said panel from an open position extending away from said vacuum blanket assembly for loading of said sheets thereon to said fixed position; and
latching said panel in said fixed position for securing the same in parallel with and spaced away from said image sheet.

16. The method of claim 15, wherein:
said panel is latched in said fixed position prior to having said peripheral edge seal formed between said panel and said vacuum blanket.

17. Apparatus for reproducing images on a light sensitive sheet from an image forming sheet in precise covering relation therewith; comprising:

a base means;

platen means supported from said base means by inflatable air bladder means for floating movement toward and away from said base means;

vacuum blanket means on said platen means having a blanket of flexible sheet material for supporting said sheets thereon bounded by a peripheral edge seal;

panel means of light transmitting material pivotally movable relative to said base means between an open position extending away from said vacuum blanket means for loading of said sheets on said blanket and an operating position in adjacent spaced apart relation generally parallel of said sheets placed on said blanket; and pump means for inflating said air bladder means to move said platen means toward said panel means in said fixed position to engage said peripheral edge seal and for withdrawing air from a space within said engaged seal between said panel means and said blanket.

18. The apparatus of claim 17, including:
latch means for securing said panel means relative to said base means in said operating position.

19. The apparatus of claim 17, wherein:
said air bladder means includes a plurality of air inflatable bladders supporting opposite edge portions of said platen means for floating movement toward and away from said panel means to engage said peripheral edge seal.

20. The apparatus of claim 17, wherein:
said pump means includes a pressure pump connected for inflating said air bladder means and a vacuum pump connected for withdrawing air from said space after said seal is engaged.

21. The apparatus of claim 17, wherein:
platen means is supportably engaged with said base means in a rest position and is movable away from said rest position out of direct supportive engagement with said base means when said air bladder means is inflated.

22. The apparatus of claim 17, including:
means for supplying pressurized air into said space between said vacuum blanket means and said panel means to release said seal after the predefined exposure time is completed.

* * * * *